(12) United States Patent
Lagerlöf et al.

(10) Patent No.: US 12,090,890 B2
(45) Date of Patent: Sep. 17, 2024

(54) METHOD OF CONTROLLING A VEHICLE ELECTRICAL SYSTEM

(71) Applicant: VOLVO TRUCK CORPORATION, Gothenburg (SE)

(72) Inventors: Fredrik Lagerlöf, Stenkullen (SE); Hanna Bryngelsson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 723 days.

(21) Appl. No.: 17/284,677

(22) PCT Filed: Oct. 12, 2018

(86) PCT No.: PCT/EP2018/077948
§ 371 (c)(1),
(2) Date: Apr. 12, 2021

(87) PCT Pub. No.: WO2020/074106
PCT Pub. Date: Apr. 16, 2020

(65) Prior Publication Data
US 2021/0354594 A1    Nov. 18, 2021

(51) Int. Cl.
*B60L 3/00* (2019.01)
*B60L 58/12* (2019.01)
(Continued)

(52) U.S. Cl.
CPC .............. *B60L 58/40* (2019.02); *B60L 58/12* (2019.02); *B60L 58/20* (2019.02);
(Continued)

(58) Field of Classification Search
CPC .......... B60L 58/40; B60L 58/12; B60L 58/20; B60L 2200/18; B60L 2240/545;
(Continued)

(56) References Cited

U.S. PATENT DOCUMENTS 8,538,614 B1    9/2013  Nam et al.
9,908,419 B2    3/2018  Steele et al.
(Continued)

FOREIGN PATENT DOCUMENTS

CN    103441553 A    12/2013
CN    104972885 A    10/2015
(Continued)

OTHER PUBLICATIONS

International Search Report and Written Opinion dated May 29, 2019 in corresponding International PCT Application No. PCT/EP2018/077948, 13 pages.
(Continued)

*Primary Examiner* — Ian Jen
*Assistant Examiner* — Hossam M Abd El Latif
(74) *Attorney, Agent, or Firm* — Venable LLP; Jeffri A. Kaminski

(57) ABSTRACT

The invention relates to a method (100) of controlling a vehicle electrical energy storage system having a plurality of battery units connectable to form a battery unit assembly for providing traction power to a vehicle electric propulsion system. The method comprises the steps of selecting (105) a plurality of sub-sets of battery units from the plurality of battery units, determining (120) an alternative operational power (AOPn) of the electrical energy storage system for each sub-set of the plurality of selected sub-sets of battery units, and for the plurality of selected sub-sets of battery units, identify (140) the sub-set having the highest alternative operational power for providing power to the electric propulsion system among the plurality of sub-sets of battery units.

15 Claims, 3 Drawing Sheets

(51) Int. Cl.
  *B60L 58/18* (2019.01)
  *B60L 58/20* (2019.01)
  *B60L 58/40* (2019.01)

(52) U.S. Cl.
  CPC ..... *B60L 2200/18* (2013.01); *B60L 2240/545* (2013.01); *B60L 2240/547* (2013.01)

(58) Field of Classification Search
  CPC .. B60L 2240/547; B60L 58/18; B60L 3/0046; Y02T 10/70
  USPC .......................................................... 701/22
  See application file for complete search history.

(56) References Cited

U.S. PATENT DOCUMENTS

| | | |
|---|---|---|
| 2004/0201362 A1 | 10/2004 | Borrego Bel et al. |
| 2007/0247106 A1 | 10/2007 | Kawahara et al. |
| 2010/0123352 A1 | 5/2010 | Elleman et al. |
| 2011/0049977 A1 | 3/2011 | Onnerud et al. |
| 2014/0002021 A1 | 1/2014 | Bertness |
| 2014/0067183 A1 | 3/2014 | Sisk |
| 2014/0372053 A1* | 12/2014 | Lin .......................... B60L 58/16 702/63 |
| 2015/0191092 A1* | 7/2015 | Saint-Marcoux ..... H02J 7/0048 320/109 |
| 2016/0114695 A1 | 4/2016 | Holgers et al. |
| 2017/0036545 A1 | 2/2017 | Lopez De Arroyabe |
| 2017/0063104 A1* | 3/2017 | Bean ...................... H02J 7/007 |
| 2018/0251034 A1* | 9/2018 | Lee ........................... H02J 7/35 |

FOREIGN PATENT DOCUMENTS

| | | |
|---|---|---|
| CN | 105083042 A | 11/2015 |
| EP | 2889174 A1 | 7/2015 |

OTHER PUBLICATIONS

Chinese Office Action dated Aug. 16, 2023 in corresponding Chinese Patent Application No. 201880098523.0, 19 pages.

* cited by examiner

METHOD OF CONTROLLING A VEHICLE ELECTRICAL SYSTEM

CROSS-REFERENCE TO RELATED APPLICATIONS

This application is a U.S. National Stage application of PCT/EP2018/077948, filed Oct. 12, 2018, and published on Apr. 16, 2020, as WO 2020/074106 A1, all of which is hereby incorporated by reference in its entirety.

TECHNICAL FIELD

The invention relates to a method of controlling a vehicle electrical energy storage system having a number of battery units connectable to form a battery units assembly for providing traction power to a vehicle electric propulsion system.

The invention can be applied in any type of hybrid vehicles or electrical vehicles, such as partly or fully electrical vehicles. Although the invention will be described with respect to an electrical bus, the invention is not restricted to this particular vehicle, but may also be used in other hybrid or electrical vehicles such as electrical trucks, electrical construction equipment, and electrical cars. The invention may also be applied in any other type of electrical vehicle such as electrical powered construction equipment, electrical working machines e.g. wheel loaders, articulated haulers, dump trucks, excavators and backhoe loaders etc.

BACKGROUND

Batteries are becoming a more common source of power for providing propulsion for vehicles. Such batteries are often rechargeable batteries and typically include a number of battery cells that may be connected in series or in parallel forming a complete battery pack for the vehicle. Typically, a battery pack includes a number of battery cells. The quality of the battery pack is partly dependent on the quality of each battery cell, thereby setting strict requirements on the production quality of the battery cells. However, the battery cells may nevertheless have somewhat different capacities despite the high quality and may also age differently due to e.g. different operating temperature of each battery cell.

Accordingly, the characteristics of the number of battery packs in a vehicle often differs relative each other. By way of example, the state of charge (SOC) for the battery cells will eventually drift apart leading to an uneven state-of-charge distribution which limits the operational performance for the battery pack.

Further, in hybrid or electrical vehicles, it is often needed to have a sufficiently good knowledge of the battery properties for various operating conditions. In order to obtain a sufficient level of information indicative of the battery properties, these types of vehicles generally include an energy management unit, sometimes denoted as a battery management system, which is configured to monitor one or more operational status of one or more batteries.

In order to avoid using the battery pack in an unfavourable manner, many electrical vehicle systems are adapted to always use the battery pack with a safety margin to the SOC limits independent on the actual SOC accuracy of the battery pack. However, this reduces the energy available in the battery, and thus also reduces the vehicle range. Also, in some systems, a fault indication is provided to alert that one or more battery packs are operating on too low level.

In some operational situations in which there is a high power demand from the vehicle, the vehicle may not have enough power to operate as expected if one or a number of battery packs are on a critical low level of charge.

US 20100123352 A1 describes one type of power systems for a hybrid vehicle comprising a power management system which continuously optimizes the use of the hybrid energy source to increase the driving range of the vehicle. The power controller receives inputs such as the state of charge for the batteries. In order to optimize the battery usage, the system does not allow the charge of the battery to drop below a predetermined value. When the charge value drops below the predetermined value, that battery is automatically disconnected from the drive motor and another fully charged battery is connected.

Despite the activity in the filed, there remains a need for an improved control of a vehicle electric propulsion system of a partly or fully electrical vehicle. In addition, it would be desirable to further improve the overall performance of the vehicle electric propulsion system during operation of the vehicle.

SUMMARY

An object of the invention is to provide an improved method of controlling an electric propulsion system by optimizing the available range and power of a vehicle electrical energy storage system. The object is at least partly achieved by a method according to claim 1.

According to a first aspect of the invention, there is provided a method of controlling a vehicle electrical energy storage system having a plurality of battery units connectable to form a battery unit assembly for providing traction power to a vehicle electric propulsion system. The method comprises the steps of:

selecting a plurality of sub-sets of battery units from the plurality of battery units;

determining an alternative operational power of the electrical energy storage system for each sub-set of the plurality of selected sub-sets of battery units;

and for the plurality of selected sub-sets of battery units, identify the sub-set having the highest alternative operational power for providing power to the electric propulsion system among the plurality of sub-sets of battery units.

In this manner, the method according to the example embodiments allows for optimizing the range and power of the vehicle by identifying the set of battery units providing an appropriate level of operational power depending on the status of the various sub-sets of the battery units. In particular, the method allows for optimizing the range and power of the electrical energy storage system of the electric propulsion system by identifying an alternative operational power to the current operational power provided by the electrical energy storage system.

The example embodiments of the invention are based on the observation that an electrical energy storage system including one or more battery units with a critical low level of electrical power may have a negative impact on the overall performance of the electrical energy storage system. Thus, if the ability of one or more battery units to provide power to the system is considered too low, it may be better from a vehicle operational point of view to disconnect the one or more battery units and continue operation of the vehicle with fewer connected battery units for providing operational power to the vehicle.

In other words, the invention is based on the insight that an operational status of a battery unit with a low operational power normally affects the status of the total operational power of the electrical energy storage system. One reason for this can be that one of the battery units has a low state-of-charge (SOC) and/or a low state-of-power (SOP). Another reason can also be that the battery unit has a low or too high temperature. By providing a method according to the example embodiments, in which the sub-sets of battery units providing the highest operational power is identified (referred to as the highest alternative operational power), it becomes possible to exclude any battery units that are limiting the power of the total electrical energy storage system.

In this context, the available operational power of the vehicle may refer to an operational parameter such as the state-of-charge (SOC) of the battery unit assembly or the state-of-power (SOP) of the battery unit assembly. By way of example, the provision of determining an alternative operational power of the electrical energy storage system for each sub-set of the plurality of selected sub-sets of battery units means that the method is configured to estimate several different operational alternatives so as to evaluate the consequences (abilities) for the electrical energy storage system if the worst battery unit (in terms of operational power level) is disconnected, if the second worst battery unit is disconnected, if the third battery unit is disconnected etc. Subsequently, the method is configured to identify the sub-set having the highest alternative operational power for providing power to the electric propulsion system among the plurality of sub-sets of battery units, thereby allowing the method to ensure that disconnection of battery units will only be performed if the disconnection of the battery units will have a positive impact on the operational power of the vehicle.

Accordingly, the example embodiments of the method provide for estimating different operational power alternatives provided by various sub-sets of the battery unit assembly and determining the ability (consequence) if the electric propulsion system is operated with a sub-set of battery units including fewer number of battery units than the total number of the battery units of the battery unit assembly. In this manner, it becomes possible to optimize the range and power of an at least partly electrically driven vehicle.

According to one example embodiment, the example embodiments of the method allows for estimating different disconnecting alternatives of the battery unit(s) and determining the ability (consequence) if the worst battery unit is disconnected from the system.

In addition, it becomes possible to estimate whether the current electrical power provided by the electrical energy storage system is sufficient for providing traction power for a given time, to an upcoming event or to an upcoming charging activity, e.g. until the next charging location.

To this end, the method is capable of estimating whether the vehicle should continue using all battery units of the battery unit assembly for providing electrical power to the electric propulsion system, e.g. to the electrical motor, or if the electrical energy storage system should be using the sub-set of battery units with the identified highest estimated alternative operational power among the plurality of sub-sets of battery units of the battery units assembly for providing electrical power to the system. That is, if the electric propulsion system should be operated by less number of battery units than the total number of battery units in the battery unit assembly.

Typically, although not strictly required, the step of determining an alternative operational power of the electrical energy storage system for each sub-set of the plurality of selected sub-sets of battery units is iterated until the sub-set of battery units having the highest operational power among the sub-sets of battery units is identified. According to one example embodiment, the steps of the method are performed in sequence. However, at least some of the steps of the method can be performed in parallel.

In other words, the step of identifying the sub-set having the highest alternative operational power for providing power to the electric propulsion system among the plurality of sub-sets of battery units typically comprises comparing the determined alternative operational powers of the sub-sets of the battery units with each other. This step of the example embodiments may for example be performed by the control unit.

When the highest alternative operational power for providing electrical power to the electric propulsion system is identified, the method may continue to estimate whether the vehicle should be powered by all battery units of the battery units assembly or if the electric propulsion system should be powered by the sub-set of battery units providing the highest alternative operational power to the electric propulsion system.

For example, if the highest alternative operational power of the electrical energy storage system is above the present available total operational power of the electrical energy storage system (i.e. when all battery units are connected and active), the method can decide to power the electric propulsion system by the sub-set of battery units providing the highest alternative operational power to the electric propulsion system rather than power the electric propulsion system with all battery units of the battery unit assembly. By way of example, this step of powering the electric propulsion system with the sub-system having the highest operational power among the sub-sets of battery units can be performed by disconnecting or disabling one or several number of battery units. In this manner, the method typically disables battery units not being part of the identified sub-set of battery units associated with the highest alternative operational power for providing power to the electric propulsion system.

In the context of the present invention, each sub-set contains at least one individual battery unit but less than the total number of battery units of the plurality of battery units in the vehicle electrical energy storage system.

According to one example embodiment, each one of the sub-sets of the plurality of sub-sets of battery units is a discrete individual battery unit. According to one example embodiment, each one of the sub-sets of the plurality of sub-sets of battery units comprises a plurality of battery units.

Typically, although strictly required, the selection of sub-sets can be determined in beforehand and information relating to the sub-sets can be stored in a control unit or the like. However, the selection of sub-sets can likewise be performed during operation of the vehicle, i.e. during driving, at stand still, or at a static charging location. The selection of sub-sets can also be updated during operation of the vehicle, at stand still, at static charging location or at a maintenance occasion of the system.

According to one example embodiment, the method further comprises the steps of determining further alternative operational powers of the electrical energy storage system for all combinations of sub-sets of battery units and, for the combinations of sub-sets, identify the combination of sub-sets having the highest alternative operational power for providing power to the electric propulsion system among the plurality of combinations of sub-sets of battery units. By evaluating all combinations of sub-sets of battery units, it becomes possible to identify the highest alternative operation power among all possible combinations of sub-sets of battery units.

According to one example embodiment, the method further comprises the steps of determining a total operational power (TOP) of the electrical energy storage system; and comparing said highest alternative operational power with the determined total operational power of the electrical energy storage system.

In this context, the term "total operational power (TOP)" refers to the prevailing total operational power provided by the electrical energy storage system when all battery units of the battery unit assembly are connected, i.e. activated to provide electrical power to the vehicle. Thus, as an example, if the electrical energy storage system comprises three battery units, the total operational power refers to the possible power provided by electrical energy storage system when all the three battery units are connected and activated to provide power. By way of example, the total operational power is derivable from any one of a state-of-power (SOP) parameter and state-of-charge (SOC) parameter of the electrical energy storage system when all battery units of the battery unit assembly are connected to each other in the electrical energy storage source.

Accordingly, the term "alternative operational power" (AOP) refers to an estimated operational power of the electrical energy storage system for a given sub-set of the plurality of selected sub-sets of the battery units. That is, the alternative operational power refers to the possible power provided by a sub-set of the battery units when such sub-set of battery units are connected and activated to provide power. Thus, as an example, if the electrical energy storage system comprises three battery units, the alternative operational power refers to the possible power provided by electrical energy storage system when a sub-set of the three battery units are connected and activated to provide power. Typically, the alternative operational power for a given sub-set of the plurality of battery units corresponds to the number of battery units in the given sub-set of the plurality of battery units multiplied by the power of the individual battery unit having the lowermost operational power in the given sub-set of the plurality of battery units. In order words, the alternative operational power for a given sub-set of the plurality of battery units is determined by multiplying the number of battery units in the given sub-set of the plurality of battery units with the power of the individual battery unit corresponding to the lowermost operational power in the given sub-set of the plurality of battery units. Also, it is to be noted that the alternative operational power may be derivable from any one a state-of-power (SOP) parameter and state-of-charge (SOC) parameter. That is, the term "alternative operational power" is indicative of any one of an estimated alternative operation power, estimated state-of-power (SOP) parameter, and estimated state-of-charge (SOC) parameter.

The term "needed operational power" refers to the operational power needed for the vehicle at the present state.

By way of example, the method comprises the step of determining the total operational power (TOP) of the electrical energy storage system by monitoring an operational parameter being indicative of the total operational power of the electrical energy storage system when the plurality of the individual battery units are used for traction power. In this context, the term "operational parameter" is indicative of any one of a state-of-power (SOP) parameter, state-of-charge (SOC) parameter and temperature.

According to one example embodiment, the method further comprises the step of determining if the total operational power of the electrical energy storage system is a low total operational power level. In this manner, the method is capable of initially determining whether the current state of the electrical energy storage system is enough for providing electrical power to the vehicle, i.e. to determine the needed operational power. If not, the method may proceed to determine an alternative operational power of the electrical energy storage system for each sub-set of the plurality of selected sub-sets of battery units and subsequently, for the plurality of selected sub-sets of battery units, identify the sub-set having the highest alternative operational power for providing power to the electric propulsion system among the plurality of sub-sets.

By way of example, the step of determining if the total operational power of the electrical energy storage system is a low total operational power level is performed by comparing the present total operational power with a threshold value indicative of a low total operational power level.

According to one example embodiment, the method further comprises the steps of monitoring an operational power of each sub-set of the plurality of sub-sets of battery units; identifying the sub-set having the lowermost operational power among the plurality of sub-sets of battery units; and determining the alternative operational power of the electrical energy storage system if the sub-set having the lowermost operational power is disabled from the electrical energy storage system. By way of example, the operational power is monitored by determining an operational parameter of each sub-set of the plurality of sub-sets of battery units, the operational parameter being indicative of any one of a state-of-power (SOP) parameter, state-of-charge (SOC) parameter and temperature (T).

When the highest alternative operational power for providing electrical power to the electric propulsion system is identified, the method estimates the option of powering the vehicle by all battery units of the battery unit assembly and the option of powering the vehicle by the sub-set of battery units providing the highest alternative operational power to the electric propulsion system. For example, if the highest alternative operational power of the electrical energy storage system is above the determined total operational power (TOP) of the electrical energy storage system, the method further comprises the step of powering the electric propulsion system by the sub-set of battery units providing the highest alternative operational power to the electric propulsion system. By way of example, the step of powering the electric propulsion system by the sub-set of battery units providing the highest alternative operational power to the electric propulsion system can be performed by disabling one or several number of battery units.

According to one example embodiment, the method further comprises the step of disabling at least one individual battery unit from the electrical energy storage system based on the step of identifying the sub-set having the highest alternative operational power for providing power to the electric propulsion system among the plurality of sub-sets. According to one example embodiment, the method further comprises the step of disabling all individual battery units not being part of the sub-set of battery units identified as having the highest alternative operational power for providing power to the electric propulsion system.

Disabling a battery unit such as a battery pack or battery cell string can be performed in several different manners. By way of example, disabling a battery unit such as a battery pack or battery cell string can be performed by controlling a contactor of the battery pack of the battery cell string.

SOP optimization is performed by disconnecting battery units that are limiting the power of the total electrical energy storage system to a level that is lower than the required performance power when the power of the total electrical energy storage system is increased with reduced number of battery units. One reason is that the power ability of the electrical energy storage system is the sum of batteries multiplied with the lowest power ability. If the total ability is low it might increase if not all batteries are used. This optimization is typically performed in a control unit configured to control the battery unit assembly, as mentioned further below. SOC optimization is performed by disconnecting battery units that have low SOC when power of the total electrical energy storage system still fulfils the performance requirement with reduced number of battery units. Temperature optimization is performed by disconnecting battery units that have low or high temperature when power of the total electrical energy storage system still fulfils the performance requirement with reduced number of battery units. The battery unit that is not connected can then be heated or cooled down before being connected.

According to one example embodiment, the method further comprises the step of connecting the disabled battery unit in response to a change in an operational condition of the electrical energy storage system.

According to one example embodiment, the method further comprises the step of determining a future operational condition of the electrical energy storage system. Typically, the future operational condition comprises any one of the following parameters: a time to a charging event and magnitude of the charging event, a time to a discharging event and magnitude of the discharging event, a range of driving cycle, a required driving range, or combinations thereof.

According to one example embodiment, the method further comprises the step of determining if an alternative total operational power of the electrical energy storage system is a low total operational power level. By way of example, the method is configured to compare the (present or prevailing) total operational power with a threshold value indicative of a low total operational power level. The threshold value can be a predetermined value stored in the control unit. In other words, the method can be configured to initially determine whether the current state of the electrical storage system can provide a sufficiently high level of electrical power for a given period of time and/or in view of upcoming events, e.g. an upcoming up-hill slope.

The method according to the example embodiments can be executed in several different manners. According to one example embodiment, the steps of the method are performed by a control unit during use of the electrical energy storage system by a electric propulsion system.

Generally, the term "electric propulsion system", as used herein, typically refers to vehicle electrical components for providing energy (such as traction energy) and for storing energy (delivering and receiving energy). Besides the electrical components as mentioned above, an electric propulsion system may include additional components such as the electrical energy source, including a battery unit assembly, cable(s), sensor(s), control units, battery management unit(s) etc. The electric propulsion system is in particular configured to deliver and receive energy for providing propulsion to the vehicle, but also for performing various vehicle operations of the vehicle.

One component of the electric propulsion system is the electrical energy storage system. The electrical energy storage system has a plurality of battery units connectable to form a battery unit assembly. Typically, the battery units of the plurality of battery units are individual battery unit.

The battery unit may be a battery cell string comprising a number of interconnected single battery cells, whereby the battery unit assembly is a battery pack for the vehicle. In this example embodiment, the plurality of battery units corresponds to a multiple numbers of individual battery strings connectable to form a battery unit assembly in the form of a battery pack.

Alternatively, the battery unit is a battery pack comprising a plurality of battery cell strings. In this case, the battery unit assembly comprises a plurality of battery packs forming a battery pack assembly. Thus, in this example embodiment, the plurality of battery units corresponds to a multiple numbers of individual battery packs connectable to form a battery pack assembly.

It is to be noted that the battery cells are generally connected in series in a battery pack, while the battery packs are connected in parallel. The battery cells may however be both connected in series and in parallel in the form of battery cell strings. Accordingly, the battery units (battery packs) are typically connected in parallel in the battery unit assembly (battery pack assembly). However, the battery cells are typically connected in series in the battery cell string, while the battery cell strings are typically connected in parallel in the battery pack.

It is to be noted that the battery unit assembly can refer to one or several number of battery pack(s). In addition, it is to be noted that the battery unit assembly can include different types of batteries. By way of example, any one of the batteries in the battery unit assembly is any one of a lithium-ion battery or sodium-ion battery. A sodium-ion battery typically includes any type of sodium iron battery or sodium ferrite battery. The battery unit assembly thus typically comprises a set of battery pack. Also, it is to be noted that the battery pack is generally a so called high voltage battery pack. In this context, the term "high voltage" refers to a battery pack of about 400-1000 voltage (V).

Further, the term "power", as used herein, typically refers to electrical power. Electrical power is the product of voltage and current.

In the context of the example embodiments of the invention, the term "state of power (SOP)", as used herein, refers to the available power at the present status of the battery unit assembly. In particular, the SOP refers to available dischargable or available chargeable power of the battery unit assembly at the present status of the battery unit assembly. The SOP can be determined for different time periods.

In the context of the example embodiments of the invention, the term "state of charge (SOC)", as used herein, refers to the available capacity at the present status of the battery unit assembly. The SOC may also include or represent the charge level of a battery cell, a single battery unit, a single battery pack, the electrical energy storage system or a combination thereof. The SOC is typically determined in percentage (%) between available capacity and rated capacity of a new battery cell or current capacity or a battery cell.

In electrical vehicles comprising a battery pack assembly, the SOC has several different purposes, e.g. it may be used as an input to other battery management functions, including but not limited to SOP, SOQ, SOR, SOE, in overall vehicle energy management, in a charging strategy, as input to an life time estimator, as input to an ageing time estimator and as input when analysing fault cases or a combination thereof.

Typically, although not strictly required, the step of monitoring the operational power of a sub-set of the plurality of the sub-sets of the battery units is performed by sensor unit configured to monitor the electrical power from one or a plurality of battery units. Thus, if the method is configured to monitor the operational power of a sub-set of the plurality of the sub-sets of the battery units, the sensor unit is configured to receive information indicative of the operational power of one or a plurality of battery units at a given point in time. It should be readily appreciated that the step of monitoring the operational power of a sub-set of the plurality of the sub-sets of the battery units is typically performed over time.

By way of example, the step of monitoring the operational power of a sub-set of the plurality of the sub-sets of the battery units, is performed by arranging a measuring sensor configured to measure the electrical power of each one of the battery units making up the battery unit assembly.

According to one example embodiment, the electric propulsion system comprises the sensor unit. The sensor unit may be any type of sensor unit capable of monitoring electoral power of a battery unit a plurality of battery units. These types of sensor units are commonly available and several different options are conceivable.

As mentioned above, the example embodiments of the method and the sequences of the methods, typically corresponding to the steps of the method, are executed by the control unit. Thus, according to one example embodiment, the steps of the method are performed by the control unit during use of the electric propulsion system.

The method may be continuously running as long as the vehicle is operative, but also continuously running when the vehicle is in a non-operative state while the battery unit assembly is used, e.g. during a charging operation. Accordingly, the phrase "during use of the battery unit assembly" may refer to the state of charging of the battery unit assembly, and to the state of using the battery unit assembly during operation of the vehicle, e.g. driving of the vehicle.

The sequences of the method may likewise be performed by other types of components and by other technologies as long as the method can provide the associated functions and effects. Moreover, the method can likewise be implemented for controlling a model of the vehicle electrical energy storage system, the model comprising an equivalent circuit of the battery units making up the vehicle electrical energy storage system. A common type of a battery model comprises an equivalent circuit model through which current-voltage characteristics may be obtained for the model battery.

According to a second aspect of the present invention, there is provided a computer program comprising program code means for performing the steps of any of the example embodiments of the first aspect when the program is run on a computer. Effects and features of the second aspect of the invention are largely analogous to those described above in connection with the first aspect.

According to a third aspect of the present invention, there is provided a computer readable medium carrying a computer program comprising program code means for performing the steps of any of the embodiments of the first aspect when the program product is run on a computer. Effects and features of the third aspect of the invention are largely analogous to those described above in connection with the first aspect.

According to a fourth aspect of the present invention, there is provided an electric propulsion system for a vehicle. The electric propulsion system comprises an electrical motor for providing power to the vehicle; an electrical energy storage system connected to the electrical motor to provide power to the electrical motor, the electrical energy storage system comprising a plurality of battery units connectable to form a battery unit assembly; and a control unit configured to: select a plurality of sub-sets of battery packs from the plurality of battery packs; determine an alternative operational power of the electrical energy storage system for each sub-set of the plurality of selected sub-sets of battery packs; and for the plurality of selected sub-sets of battery packs, identify the sub-set having the highest alternative operational power for providing power to the electric propulsion system among the plurality of sub-sets.

Effects and features of the fourth aspect of the invention are largely analogous to those described above in connection with the first aspect.

The electrical motor can be provided in several different manners. According to one example embodiment, the electrical motor is any one of a permanent magnet synchronous machine, a brushless DC machine, an asynchronous machine, an electrically magnetized synchronous machine, a synchronous reluctance machine or a switched reluctance machine. Typically, the electrical motor is configured for driving at least a ground engaging member. Typically, the electric motor is configured for driving a pair of ground engaging members. By way of example, the ground engaging member is a wheel, a track or the like. The electrical motor can be coupled to the ground engaging members in several different manners. In one example embodiment, the electrical motor is coupled to a pair of ground engaging members by means of a transmission and a clutch. The transmission typically comprises a number of gears including a neutral gear.

The control unit may include a microprocessor, microcontroller, programmable digital signal processor or another programmable device. Thus, the control unit comprises electronic circuits and connections as well as processing circuitry such that the control unit can communicate with different parts of the electric propulsion system such as the electrical machines, the switch assembly, the electrical energy source, the bidirectional DC/AC converters and any other parts in need of being operated in order to provide the functions of the example embodiments. Typically, the control unit may also be configured to communicated with other parts of the vehicle such as the brakes, suspension, the clutch, transmission and further electrical auxiliary devices, e.g. the air conditioning system, in order to at least partly operate the bus. The control unit may comprise modules in either hardware or software, or partially in hardware or software and communicate using known transmission buses such as CAN-bus and/or wireless communication capabilities. The processing circuitry may be a general purpose processor or a specific processor. The control unit typically comprises a non-transistory memory for storing computer program code and data upon. Thus, the control unit may be embodied by many different constructions.

In other words, the control functionality of the example embodiments of the electric propulsion system may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions. While the example embodiments of the electric propulsion system described above includes a control unit being an integral part thereof, it is also possible that the control unit may be a separate part of the vehicle, and/or arranged remote from the electric propulsion system and in communication with the electric propulsion system.

The control unit may also include a model of one battery unit or a plurality of battery units, or a combination thereof. Thus, the electrical energy storage system typically includes the control unit configured to control the functionality of the battery unit assembly. In other words, the electrical energy storage system is typically a part of the vehicle propulsion system. The electrical energy storage system may also include a so called battery management unit which can be an integral part of the control unit or a separate part of the system but in communication with the control unit.

The control unit is generally configured to control and monitor the battery pack assembly. Typically, although strictly not required, the control unit includes the battery management unit configured to monitor battery cell characteristics such as state of charge (SOC) and open circuit voltage of the battery cells. Other functions of the battery management unit may relate to safety functions, such as state-of-power, and/or closing the contactors.

According to a fifth aspect of the present invention, there is provided a vehicle, such as a fully or hybrid electrical vehicle, comprising an electric propulsion system according to any one of the example embodiment mentioned above. Effects and features of the fifth aspect of the invention are largely analogous to those described above in connection with the first aspect.

The vehicle may be an electrical, hybrid, or plug-in hybrid vehicle comprising an electrical motor, wherein the battery unit assembly provides power to the electrical motor for providing propulsion for the electrical, hybrid, or plug-in hybrid vehicle. It is to be noted that the vehicle can therefore be either a partly of fully electrical vehicle.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

Figure 1:
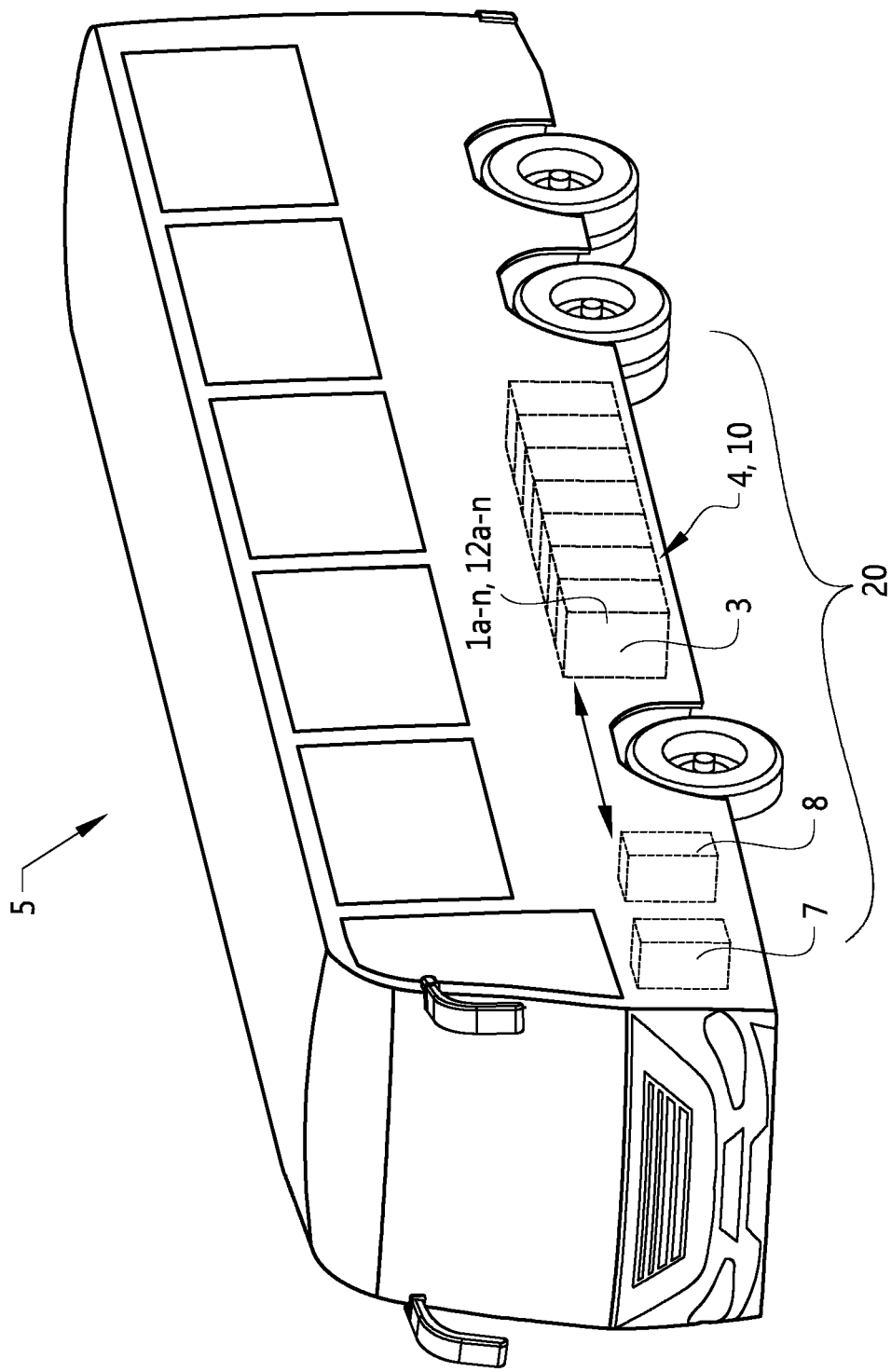
FIG. 1 is a side view of vehicle in the form an electrical bus according to example embodiments of the invention.

With reference to the appended drawings, below follows a more detailed description of embodiments of the invention cited as examples.

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The skilled person will recognize that many changes and modifications may be made within the scope of the appended claims. Like reference character refer to like elements throughout the description.

FIG. 1 illustrates a vehicle in the form of an electrical bus 5. In other words, the electrical bus is a fully electrical vehicle. The electrical bus 5 comprises an electric propulsion system 20 configured to provide traction power to the vehicle. The electric propulsion system can also be adapted to manage various types of electronic functions of the vehicle. The electric propulsion system thus comprises an electrical energy storage system 10 and an electrical motor 7. The electrical energy storage system 10 is connected to the electrical motor to provide power to the electrical motor, thereby the electrical motor can provide traction power to one or more ground engaging members, e.g. one or more wheels. The electrical energy storage system 10 here comprises a battery unit assembly 4. The battery unit assembly typically includes a plurality of battery units $1_a$ to $1_n$. In the electrical energy storage system depicted in FIG. 1, the battery unit is a battery pack. In this context, the battery pack is a battery comprising a plurality of battery cells 3. As such, each one of the battery packs $1_a$ to $1_n$ comprises a plurality of battery cells 3. To this end, the electrical energy storage system comprises a multiple number of battery packs connected to form the battery pack assembly 4. In the following description of the example embodiments of the invention, the battery unit will therefore sometimes be referred to as a battery pack and the battery unit assembly as a battery pack assembly.

Accordingly, the battery pack assembly 4 is arranged to provide electrical power to the electrical motor 7 configured to provide propulsion for the electrical bus 5. Typically, the electrical bus 5 further comprises a control unit 8 configured to control and monitor the electrical energy storage system 10. In particular, the control unit 8 is configured to control and monitor the battery pack assembly 4. Typically, although strictly not required, the control unit 8 has a battery management unit 2 (FIG. 2) configured to monitor battery cell characteristics such as state of charge (SOC) and open circuit voltage of the battery cells 3.

Figure 2:
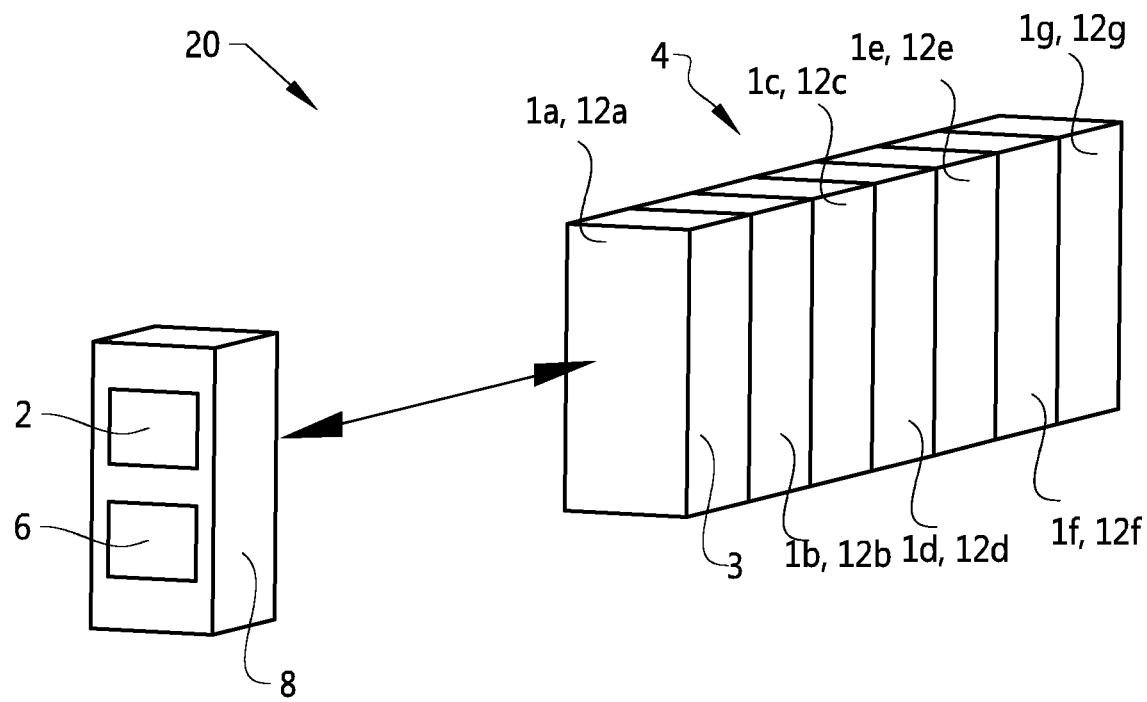
FIG. 2 schematically illustrates parts of an electric propulsion system of the vehicle in FIG. 1, the electric propulsion system comprises an electrical energy storage system according to example embodiments of the invention.

FIG. 2 schematically illustrates further details of the electric propulsion system 20 according to the example embodiment in FIG. 1. The electric propulsion system 20 can be incorporated and installed in a vehicle as mentioned above in relation to FIG. 1, or in any other type of partly or fully electrical vehicle.

The electric propulsion system 20 comprises the electrical energy storage system 10. The electrical energy source is a DC electrical energy source such as the battery pack assembly comprising the number of battery packs. By way of example, each one of the battery packs is a lithium-ion battery. Moreover, each one of the battery packs comprises a number of battery cells. For instance, the battery pack assembly comprises seven battery packs, as depicted in FIG. 2. The number of battery packs in the battery pack assembly and the number of battery cells varies depending on type of vehicle and type of installation, etc.

In particular, the electric propulsion system 20 here comprises the control unit 8 including the battery management unit 2 and the battery pack assembly 4. Optional, the electric propulsion system also comprises a sensor unit 6 for measuring electrical power of the battery pack assembly 4. The sensor unit 6 is here an integral part of the control unit 8. In FIG. 2, the battery pack assembly comprises seven battery packs. The battery pack assembly 4 thus includes seven number of battery packs $1_a$-$1_g$, each one of them comprising a number of battery cells 3. The number of battery packs in the battery pack assembly and the number of battery cells varies depending on type of vehicle and type of installation, etc. In this example, the battery cells are connected in series in each one of the battery packs. Further, the battery packs are generally connected in parallel.

Moreover, the battery packs are grouped into a number of sub-sets $12_a$, $12_b$, $12_c$, $12_d$, $12_e$, $12_f$ to $12_g$ of battery packs from the multiple numbers of battery packs $1_a$, $1_b$, $1_c$, $1_d$, $1_e$, $1_f$ to $1_g$. In this example, each sub-set of battery packs contains one individual battery pack.

Thus, each sub-set of the battery packs provides operational electrical power to the electrical motor.

Typically, the sensor unit 6 is arranged to provide a measurement of at least one parameter which reflects the electrical power of the battery pack assembly 4. In particular, the sensor unit 6 is arranged to provide a measurement of at least one parameter which reflects the electrical power of one battery pack and/or a combination of battery packs. In other words, the sensor unit is arranged to provide a measurement of at least one parameter which reflects the electrical power of each one of the sub-sets $12_a$, $12_b$, $12_c$, $12_d$, $12_e$, $12_f$ to $12_g$ of the battery pack assembly 4, and thus also a measurement of at least one parameter which reflects the electrical power of a combination of sub-sets of the battery pack assembly. By way of example, the electrical power can be monitored by providing a measurement of the current inflow and a measurement of the current outflow of each battery pack of the battery pack assembly by means of the sensor unit 6. Typically, the system also monitor and measure the voltage over each battery pack of the battery pack assembly. Also the voltage can be measured by means of a sensor unit configured to measure voltage. For this reason, each battery pack of the battery pack assembly is operatively connected to the sensor unit in order to permit the sensor unit to gather the relevant data regarding electrical power, e.g. current inflow and current outflow, as well as voltage. The sensor unit should at least be configured to communicate with the control unit 8, i.e. to transmit data relating to relevant measurements as mentioned herein. The sensor unit 6 may be a current sensor configured to measure current in ampere, or any other sensor capable of measuring the inflow and outflow of current through a battery. These types of sensor units are commonly available and several different options are conceivable. Also, the sensor unit may be a voltage sensor configured to measure the voltage. However, the system generally uses a sensor unit, or sensor assembly comprising a number of sensors, configured to measure both current and voltage. By way of example, the sensor unit 6 is arranged to measure the current through each battery pack and the voltage over each battery cell and each battery pack. To this end, the sensor unit 6 comprises a number of sensors arranged to measure current and voltage over each battery cell and each battery pack.

The electrical power is the product of voltage and current. Hence, the electrical power can be derivable from the measurements relating to voltage and current. The data relating to the electrical power is transmitted to the control unit 8 for further processing. Accordingly, the sensor unit is operatively connected to the control unit. The communication between the sensor unit and the control unit can be made by a wire connection, wireless or by any other technology such as Bluetooth or the like.

The data relating to voltage and current can may also be obtained from a model of the battery pack assembly, as is generally used in the field of battery pack assemblies of for vehicles. The model comprises an equivalent circuit of the battery system. A common type of a battery model comprises an equivalent circuit model through which current-voltage characteristics may be obtained for the model battery system. The characterization of the battery cell may be calculated by real-time parameter estimation approaches on battery models using direct battery measurements. The battery cell charge state estimation may for example be based on measured battery current inputs and a battery terminal voltage. By the equivalent circuit model of the battery cell, it becomes possible to determine a state charge level of a battery cell. As such, it is possible to monitor the state charge level of a battery cell of the battery system. Measuring of current and voltage to determine electrical power is generally a standard process in this type of system, thus not further described herein.

While the example embodiment described above includes a control unit being an integral part of the system 20, it is also possible that the control unit may be a separate part of the system 20 or the like.

In this example embodiment, the control unit 8 is configured to estimate an operational parameter indicative of the operational power for each one of the battery packs. By way of example, the control unit is configured to determine the SOC for each one of the battery pack. The SOC can be determined based on the algorithm:

$$SOC = \frac{Q_{act}}{Q_{batt}} \times 100 \qquad \text{(Eq. 1)}$$

wherein

Figure 3:
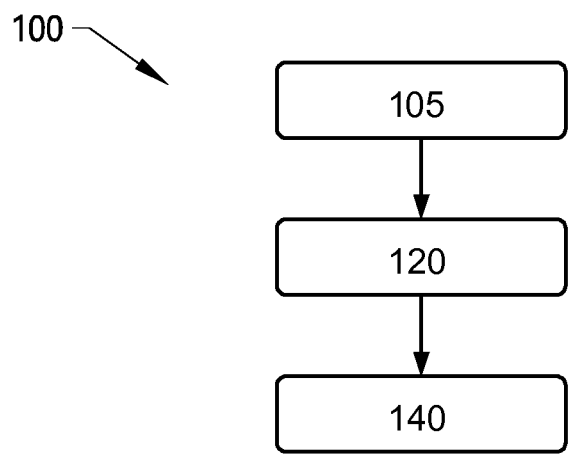
FIG. 3 is a flow-chart of a method according to an example embodiment of the invention, in which the method comprises a number of steps for controlling the electrical energy storage system of the electric propulsion system in FIG. 2.

SOC is the level of charge at the present moment of the battery pack assembly;

$Q_{act}$ is the amount of remaining capacity of the battery pack assembly; and $Q_{batt}$ is the rated nominal capacity at the present age of the calculation Turning now to FIG. 3, there is depicted a flowchart of a method according to example embodiments of the invention. The method is intended for controlling the vehicle electrical energy storage system 10 of the vehicle electric propulsion system 20 as described above in relation to FIGS. 1 and 2. The method is here intended for controlling a vehicle electrical energy storage system 10 of the vehicle electric propulsion system 20 in the electrical bus 5. The sequences of the method are typically performed by the control unit 8, as described above in relation to the FIGS. 1 and 2.

The method comprises a step of selecting 105 the plurality of sub-sets $12_a$, $12_b$, $12_c$, $12_d$, $12_e$, $12_f$ to $12_n$ of battery packs from the multiple numbers of individual battery packs $1_a$, $1_b$, $1_c$, $1_d$, $1_e$, $1_f$ to $1_n$. As mentioned above, the total number of battery packs of the battery packs assembly is seven. Thus, each one of the sub-sets of the plurality of sub-sets of battery units comprises seven individual battery pack $1_a$, $1_b$, $1_c$, $1_d$, $1_e$, $1_f$ and $1_g$. To this end, the number of sub-sets is seven, i.e. the method is performed on seven sub-sets $12_a$, $12_b$, $12_c$, $12_d$, $12_e$, $12_f$ and $12_g$ of battery packs. In other words, each sub-set of battery packs contains at least less number of battery packs than the total number of battery packs of the multiple number of individual battery packs in the vehicle electrical energy storage system. The selection of the number of sub-sets of the battery packs is performed by the control unit 8. Typically, although strictly required, the selection of sub-sets can be determined in beforehand, e.g. at programming of the software of the control unit.

In the following step, it is determined 120 a parameter indicative of an alternative operational power $(AOP_n)$ of the electrical energy storage system 10 for each sub-set $12_a$ to $12_n$ of the plurality of selected sub-sets $12_a$ to $12_n$ of battery packs $1_a$ to $1_n$. In this context, alternative operational power refers to an estimated operational power of the electrical energy storage system for a given sub-set of the plurality of selected sub-sets of the battery units. In other words, in step 120, the method estimates an alternative operational power $AOP_a$ to $AOP_g$, i.e. the method estimates alternative operational powers for each one of the selected sub-sets $12_a$ to $12_g$ of the selected sub-sets of battery packs. By way of example, the alternative operational power of one sub-set of the plurality of battery packs is determined by multiplying the number of battery packs in the one sub-set with the power of the individual battery pack having the lowermost operational power in the one sub-set. In addition, or alternatively, the operational power may be derivable by determining the state-of-charge (SOC) parameter of a given sub-set of the plurality of sub-sets of battery packs, as mentioned above. In other words, in step 120, the method estimates the state-of-charge (SOC) for each one of the selected sub-sets $12_a$ to $12_g$ of the selected sub-sets of battery packs.

If the selected sub-set of battery packs comprises more than one battery pack and the alternative operation power refers to the SOP, the alternative operational power of the selected sub-set corresponds to the number of battery packs in the selected sub-set of the plurality of battery packs multiplied by the operational power of the individual battery pack having the lowermost operational power in the sub-set of the plurality of battery packs.

In other words, in this example embodiment, the method in step 120 determines a first alternative operational power $(AOP_1)$ of the electrical energy storage system 10 for the first sub-set $12_a$. As mentioned above, the first sub-set $12a$ comprises the first battery pack $1_a$. Subsequently, the method in step 120 determines a second alternative operational power $(AOP_2)$ of the electrical energy storage system 10 for the second sub-set $12_b$. As mentioned above, the second sub-set $12_b$ comprises the second battery pack $1_b$. Further, the method in step 120 determines a third alternative operational power $(AOP_3)$ of the electrical energy storage system 10 for the third sub-set $12_g$. As mentioned above, the third sub-set 14 comprises the third battery pack $1_g$. The method here continues to determine alternative operational powers $(AOP_n)$ of the electrical energy storage system 10 for each sub-set $12_a$ to $12_n$ of the plurality of selected sub-sets $12_a$ to $12_n$ of the battery packs $1_a$ to $1_n$. Accordingly, in this example, the method continues to determine the AOP of the electrical energy storage system until the seventh alternative operational power $(AOP_7)$ of the electrical energy storage system 10 for the seventh sub-set $12_g$ is determined. As mentioned above, the seventh sub-set $12_g$ comprises the seventh battery pack $1_g$.

The step 120 of determining the alternative operational powers (AOPn) of the electrical energy storage system 10 for each sub-set $12_a$ to $12_g$ of the plurality of selected sub-sets $12_a$ to $12_g$ of battery packs $1a$ to $1n$ can be performed in several different manners. As an example, the step 120 can be performed by the step of monitoring an operational power $(OP_n)$ of each sub-set of the plurality of sub-sets of battery packs. In this example, the step 120 is thus performed by monitoring an operational power $(OP_n)$ of each battery pack of the battery packs assembly, i.e. the step 120 is performed by monitoring the SOC of each battery pack of the battery packs assembly.

Then, at least for the plurality of selected sub-sets of battery packs, the method comprises the step of identifying 140 the sub-set having the highest alternative operational power for providing power to the electric propulsion system among the plurality of sub-sets. By way of example, the method identifies the sub-set having the highest estimated SOC (alternative operational power) among the plurality of sub-sets of the battery packs of the battery pack assembly by comparing the determined SOC of the sub-sets of the battery units with each other. This step of the example embodiments may for example be performed by the control unit. If the alternative operational power refers to the SOP, the method identifies the sub-set having the highest estimated SOP among the plurality of sub-sets of the battery packs of the battery pack assembly by comparing the determined SOP of the sub-sets of the battery units with each other. This step of the example embodiments may for example be performed by the control unit In this manner, the method is capable of estimating whether the electrical bus should continue using all battery packs of the battery pack assembly for providing electrical power to the electrical motor or if the electrical energy storage system should be using the sub-set having the highest estimated SOC among the plurality of sub-sets of the battery packs of the battery pack assembly for providing electrical power to the electrical motor, i.e. if the electrical bus should be operated by less number of battery packs than the total number of battery packs in the battery pack assembly.

It should be noted that the method may, as an alternative to SOC, identify the sub-set having the highest estimated SOP among the plurality of sub-sets of the battery packs of the battery pack assembly.

Figure 4:
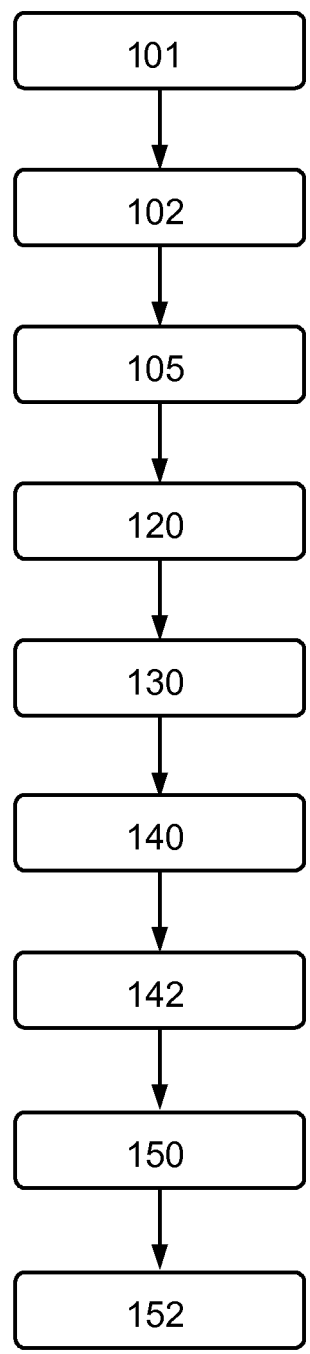
FIG. 4 is a flow-chart of additional steps of the method in FIG. 3 according to an example embodiment of the invention, in which the method comprises a number of steps for controlling the electrical energy storage system of the electric propulsion system in FIG. 2.

Turning now to FIG. 4, there is depicted some additional optional steps of the method according to the example embodiment described in relation to FIG. 3. In other words, the method as described in FIG. 4 comprises the steps 105, 120 and 140 as described above in relation to FIG. 3. While referring to the example embodiment as depicted in FIG. 4, the method 100 firstly estimate whether the present electrical power provided by the electrical energy storage system is sufficient for providing traction power for a given time, to an upcoming event or to an upcoming charging activity, e.g. until the next charging location. Thus, the method comprises the step 101 of determining the total operational power (TOP) of the electrical energy storage system. The prevailing total operational power provided by the electrical energy storage system corresponds to the total operational power of the electrical energy storage system when all battery units of the battery unit assembly are connected, i.e. activated to provide electrical power to the vehicle. By way of example, the total operational power corresponds to the state-of-charge (SOC) of the electrical energy storage system when all battery units of the battery unit assembly are connected. In other words, step 101 can be performed by determining the state-of-charge (SOC) of the electrical energy storage system when all battery units of the battery unit assembly are connected.

Next, the method here comprises the step 102 of determining if the total operational power (TOP) of the electrical energy storage system is a low total operational power level. By way of example, the method is configured to compare the (present or prevailing) total operational power with a threshold value indicative of a low total operational power level. The threshold value can be a predetermined value stored in the control unit. In other words, the method is configured to initially determine whether the current state of the electrical storage system can provide a sufficiently high level of electrical power for a given period of time and/or in view of upcoming events.

If it is determined that the total operational power of the electrical energy storage system is a low total operational power level, the method performs the step of selecting 105 the plurality of sub-sets $12_a$, $12_b$, $12_c$, $12_d$, $12_e$, $12_f$ to $12_n$ of battery packs from the multiple numbers of individual battery packs $1_a$, $1_b$, $1_c$, $1_d$, $1_e$, $1_f$ to $1_n$. The step 105 is typically performed in a similar manner as the step 105 as mentioned in relation to the FIG. 3.

It is to be noted that the steps 101 and 102 can be performed in a parallel to step 105 or after the step 105. Also, the step of determining 101 the total operational power of the electrical energy storage system can also be performed in conjunction with the step 102, or after the step 102.

Thereafter, the method determines 120 the alternative operational power ($AOP_n$) of the electrical energy storage system 10 for each sub-set $12_a$ to $12_n$ of the plurality of selected sub-sets $12_a$ to $12_n$ of battery packs $1_a$ to $1_n$. The step 120 is typically performed in a similar manner as the step 120 as mentioned in relation to the FIG. 3. That is, the method in step 120 determines a first alternative operational power (AOP1) of the electrical energy storage system 10 for the first sub-set 12a. Subsequently, the method in step 120 determines a second alternative operational power (AOP2) of the electrical energy storage system 10 for the second sub-set 12b. Further, the method in step 120 determines a third alternative operational power (AOP3) of the electrical energy storage system 10 for the third sub-set 12c. The method here continues to determine alternative operational powers (AOPn) of the electrical energy storage system 10 for each sub-set 12a to 12n of the plurality of selected sub-sets 12a to 12n of the battery packs 1a to 1n. Accordingly, in this example, the method continues to determine the AOP of the electrical energy storage system until the seventh alternative operational power (AOP7) of the electrical energy storage system 10 for the seventh sub-set 12g is determined.

Next, the method further comprises the step of determining 130 further alternative operational powers of the electrical energy storage system for all combinations of sub-sets of battery packs. For example, step 130 includes determining an alternative operational power of the electrical energy storage system 10 for the combination of the first sub-set 12a and the second sub-set 12. The first sub-set 12a comprises the first battery pack 1a and the second sub-set 12b comprises the second battery pack 1b. Subsequently, the method in step 130 determines an alternative operational power of the electrical energy storage system 10 for the combination of the second sub-set 12b and the third sub-set 12c. The second sub-set 12b comprises the second battery pack 1b and the third sub-set 12c comprises the third battery pack 1c. Further, the method in step 130 determines an alternative operational power of the electrical energy storage system 10 for the combination of the first sub-set 12a and the third sub-set 12c. The method here continues to determine alternative operational powers (AOPn) of the electrical energy storage system 10 for each combination of sub-sets 12a to 12n of the plurality of selected sub-sets 12a to 12n of the battery packs 1a to 1n. Accordingly, in this example, the method continues to determine the AOP of the electrical energy storage system until all combinations of sub-sets of battery packs have been determined.

Then, in step 140, the method comprises the previous provision of identifying the sub-set having the highest alternative operational power for providing power to the electric propulsion system among the plurality of sub-sets, and, for all combinations of sub-sets of battery packs, the method further comprises the step of identifying the combination of sub-sets having the highest alternative operational power for providing electrical power to the electric propulsion system among the plurality of combinations of sub-sets.

Moreover, the method also comprises the step 142 of comparing the highest alternative operational power with the determined total operational power (TOP) of the electrical energy storage system, as is determined in step 101 above.

Optionally, the method here also comprises the step of determining if the highest alternative operational power of the electrical energy storage system is above the determined total operational power (TOP) of the electrical energy storage system.

When the highest alternative operational power for providing electrical power to the electric propulsion system is identified, the method estimates whether the electrical bus should be powered by all connected battery packs of the battery pack assembly or if the electric propulsion system of the electrical bus should be powered by the sub-set of battery packs providing the highest alternative operational power to the electric propulsion system.

For example, if the highest alternative operational power of the electrical energy storage system is above the determined total operational power (TOP) of the electrical energy storage system, the method further comprises the step 150 of powering the electric propulsion system by the sub-set of battery packs providing the highest alternative operational power to the electric propulsion system, as identified in step 140 above.

By way of example, the step 150 can be performed by disconnecting or disabling one or several number of battery packs. Typically, the method subsequently comprises the step 152 of disabling at least one individual battery pack from the electrical energy storage system based on the step of identifying the sub-set having the highest alternative operational power for providing power to the electric propulsion system among the plurality of sub-sets. In particular, the method disables the battery packs not being part of the identified sub-set having the highest alternative operational power for providing power to the electric propulsion system.

Figure 5:
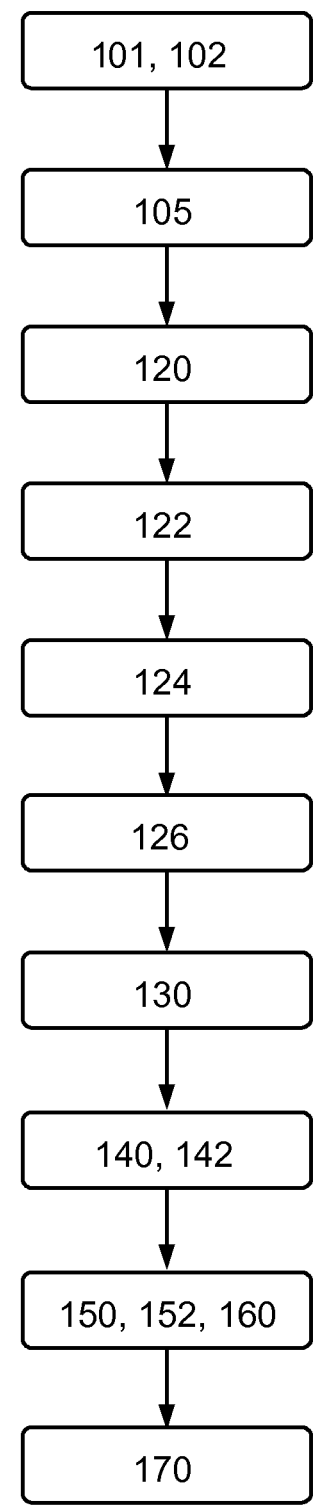
FIG. 5 is a flow-chart of further steps of the method in FIG. 3 and FIG. 4 according to an example embodiment of the invention, in which the method comprises a number of steps for controlling the electrical energy storage system of the electric propulsion system in FIG. 2.

FIG. 5 depicts some additional steps of the method according to another example embodiment. As illustrated in FIG. 5, the method described in relation to FIG. 5 comprises the steps of the method described in relation to FIG. 3 and typically the additional steps described in relation to FIG. 4. Firstly, the method performs the steps 101, 102 and 105, relating to process of determining the total operational power TOP of the electrical energy storage system.

Thereafter, the method performs the step 120 of determining the alternative operational power ($AOP_n$) of the electrical energy storage system 10 for each sub-set $12_a$ to $12_n$ of the plurality of selected sub-sets $12_a$ to $12_n$ of battery packs $1_a$ to $1_n$. Moreover, the step 120 typically comprises a step of monitoring 122 an operational power ($OP_n$) of each sub-set of the plurality of sub-sets of battery packs. In this example, the step 120 is performed by monitoring an operational power ($OP_n$) of each battery pack of the battery packs assembly, e.g. by monitoring the SOC of each battery pack of the battery packs assembly. Furthermore, the method here comprises the step 124 of identifying the sub-set having the lowermost operational power among the plurality of sub-sets of battery packs. The step 124 of identifying the sub-set having the lowermost operational power among the plurality of sub-sets of battery packs is performed by comparing the determined operational powers of the sub-sets of battery packs with each other.

Next, the method here comprises the step 126 of determining the alternative operational power of the electrical energy storage system if the sub-set having the lowermost operational power is disabled from the electrical energy storage system.

Next, the method performs the optional step 130 of determining further alternative operational powers of the electrical energy storage system for all combinations of sub-sets of battery packs. Then, at least for the combinations of sub-sets, the method comprises the step of identifying the combination of sub-sets having the highest alternative operation power for providing power to the electric propulsion system among the plurality of combinations of sub-sets. Then, at least for the plurality of selected sub-sets of battery packs, the method comprises the step 140 of identifying the sub-set having the highest alternative operational power for providing power to the electric propulsion system among the plurality of sub-sets.

Typically, the method then performs the step 142 of comparing the highest alternative operational power with the determined total operational power (TOP) of the electrical energy storage system, the step 150 of powering the electric propulsion system by the sub-set of battery packs providing the highest alternative operational power to the electric propulsion system and the step 152 of disabling the individual battery pack from the electrical energy storage system based on the step of identifying the sub-set having the highest alternative operational power for providing power to the electric propulsion system among the plurality of sub-sets.

In driving situations where the vehicle may require electrical power from all battery packs of the electrical energy storage system, e.g. at a steep up-hill slope or during an overtaking, the method may also re-evaluate the total operational power and the alternative total operational power, as mentioned above. Based on the re-evaluation process, the method can determine to re-connect the disabled battery back. Thus, the method here comprises the step 160 of connecting the disabled battery pack in response to a change in an operational condition of the electrical energy storage system, the change being indicative of e.g. a steep up-hill slope or an overtaking.

Accordingly, the disabled battery pack not being part of the sub-set with the highest operational power may be re-connected 160 in response to a change in an operational condition of the electrical energy storage system.

Moreover, in example embodiment described in relation to FIG. 5, the method further comprises a step 170 of determining a future operational condition of the electrical energy storage system. The future operational condition comprises at least one of: time to a charging event and magnitude of the charging event, time to discharging event and magnitude of the discharging event, range of driving cycle, required driving range, or combinations thereof.

As mentioned above, it is to be noted that the steps of the method is typically performed by the control unit 8 during use of the electrical energy storage system 10 by the electric propulsion system 20. Thus, the control unit is configured to perform any one of the steps of any one of the example embodiments as described above in relation to the FIGS. 1-5.

Although the figures may show a sequence, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

It is to be understood that the present invention is not limited to the embodiments described above and illustrated in the drawings; rather, the skilled person will recognize that many changes and modifications may be made within the scope of the appended claims. For example, although the present invention has mainly been described in relation to an electrical bus, the invention should be understood to be equally applicable for any type of electrical vehicle, in particular an electrical truck or the like.

The invention claimed is:

1. A method of controlling a vehicle electrical energy storage system having a plurality of battery units connectable to form a battery unit assembly for providing traction power to a vehicle electric propulsion system, the method comprising:

selecting a plurality of sub-sets of battery units from the plurality of battery units;

determining an alternative operational power (AOPn) of the electrical energy storage system for each sub-set of the plurality of selected sub-sets of battery units, wherein the alternative operational power for a given sub-set of the plurality of battery units corresponds to the number of battery units in the given sub-set of the plurality of battery units multiplied by the power of the individual battery unit having the lowermost operational power in the given sub-set of the plurality of battery units; and for the plurality of selected sub-sets of battery units, identify the sub-set having the highest alternative operational power for providing power to the electric propulsion system among the plurality of sub-sets of battery units.

2. Method according to claim 1, further comprising the steps of:

determining further alternative operational powers of the electrical energy storage system for all combinations of sub-sets of battery units;

for the combinations of sub-sets, identify the combination of sub-sets having the highest alternative operation power for providing power to the electric propulsion system among the plurality of combinations of sub-sets.

3. Method according to claim 1, further comprising the steps of:

determining a total operational power (TOP) of the electrical energy storage system; and comparing said highest alternative operational power with the determined total operational power (TOP) of the electrical energy storage system.

4. Method according to claim 3, further comprising the step of determining if the total operational power of the electrical energy storage system is a low total operational power level.

5. Method according to claim 1, further comprising the steps of:

monitoring an operational power ($OP_n$) of each sub-set of the plurality of sub-sets of battery units;

identifying the sub-set having the lowermost operational power among the plurality of sub-sets of battery units; and determining the alternative operational power of the electrical energy storage system if the sub-set having the lowermost operational power is disabled from the electrical energy storage system.

6. Method according to claim 5, wherein said operational power is monitored by determining an operational parameter of each sub-set of the plurality of sub-sets of battery units, the operational parameter being indicative of any one of a state-of-power (SOP) parameter, state-of-charge (SOC) parameter and temperature (T).

7. Method according to claim 1, further comprising the step of:

disabling at least one individual battery unit from the electrical energy storage system based on the step of identifying the sub-set having the highest alternative operational power for providing power to the electric propulsion system among the plurality of sub-sets.

8. Method according to claim 7, further comprising the step of connecting the disabled battery unit in response to a change in an operational condition of the electrical energy storage system.

9. Method according to claim 8, further comprising the step of determining a future operational condition of the electrical energy storage system.

10. Method according to claim 9, wherein the future operational condition comprises any one of: a time to a charging event and magnitude of the charging event, a time to discharging event and magnitude of the discharging event, a range of a driving cycle, a required driving range, or combinations thereof.

11. Method according to claim 1, further comprising the step of determining if an alternative total operational power of the electrical energy storage system is a low total operational power level.

12. Method according to claim 1, in which the steps of the method is performed by a control unit during use of the electrical energy storage system by an electric propulsion system.

13. A non-transitory computer readable medium carrying a computer program comprising program code for performing the steps of claim 1 when said program code is run on a computer.

14. An electric propulsion system for a vehicle, the electric propulsion system comprising:

an electrical motor for providing power to the vehicle;

an electrical energy storage system connected to the electrical motor to provide power to the electrical motor, the electrical energy storage system comprising a multiple number of battery units connectable to form a battery unit assembly;

a control unit configured to select a plurality of sub-sets of battery units from the plurality of battery units; determine an alternative operational power of the electrical energy storage system for each sub-set of the plurality of selected sub-sets of battery units, wherein the alternative operational power for a given sub-set of the plurality of battery units corresponds to the number of battery units in the given sub-set of the plurality of battery units multiplied by the power of the individual battery unit having the lowermost operational power in the given sub-set of the plurality of battery units; and for the plurality of selected sub-sets of battery packs, identify the sub-set having the highest alternative operational power for providing power to the electric propulsion system among the plurality of sub-sets.

15. A vehicle, such as a fully or hybrid electrical vehicle, comprising an electric propulsion system according to claim 14.

* * * * *